United States Patent [19]

Peltz

[11] Patent Number: 4,657,068
[45] Date of Patent: Apr. 14, 1987

[54] DEVICE FOR FACILITATING THE CIRCULATION OF FLUID COOLANT

[75] Inventor: Hanns-Heinz Peltz, Munich, Fed. Rep. of Germany

[73] Assignee: Bruce Zimring, Palo Alto, Calif.

[21] Appl. No.: 872,120

[22] Filed: Jun. 9, 1986

[30] Foreign Application Priority Data

Jun. 14, 1985 [DE] Fed. Rep. of Germany ....... 3521510

[51] Int. Cl.⁴ .................. B23Q 11/10; B25B 11/00
[52] U.S. Cl. .......................... 165/47; 51/235; 51/266; 51/356; 83/169; 83/170; 269/21; 408/56; 408/61; 408/76; 409/136
[58] Field of Search ............... 51/356, 266, 235; 269/21; 165/47; 408/56, 60, 61, 76; 409/135, 136; 83/169, 170

[56] References Cited

U.S. PATENT DOCUMENTS

| 2,339,324 | 1/1944 | Fischer | 408/56 |
| 3,536,594 | 10/1970 | Pritchard | 269/21 |
| 3,594,953 | 7/1971 | Stade | 51/356 |
| 4,236,701 | 12/1980 | Mayer | 269/21 |
| 4,325,663 | 4/1982 | Lee | 409/136 |

FOREIGN PATENT DOCUMENTS

| 2813091 | 6/1979 | Fed. Rep. of Germany | 51/266 |
| 140119 | 2/1980 | German Democratic Rep. | 51/266 |

Primary Examiner—Albert W. Davis, Jr.
Attorney, Agent, or Firm—Flehr, Hohbach, Test, Albritton & Herbert

[57] ABSTRACT

Device (1) for facilitating the circulation of fluid coolant having, in compact form, a circulating pump (7), a settling cascade (17) and a negative-pressure pump (20) for suctioning a workpiece (54) onto a worktable (21). The transfer pump (7) and a negative-pressure pump (20) are connected to operate with one another in the coolant cycle and to prevent loss of coolant.

10 Claims, 1 Drawing Figure

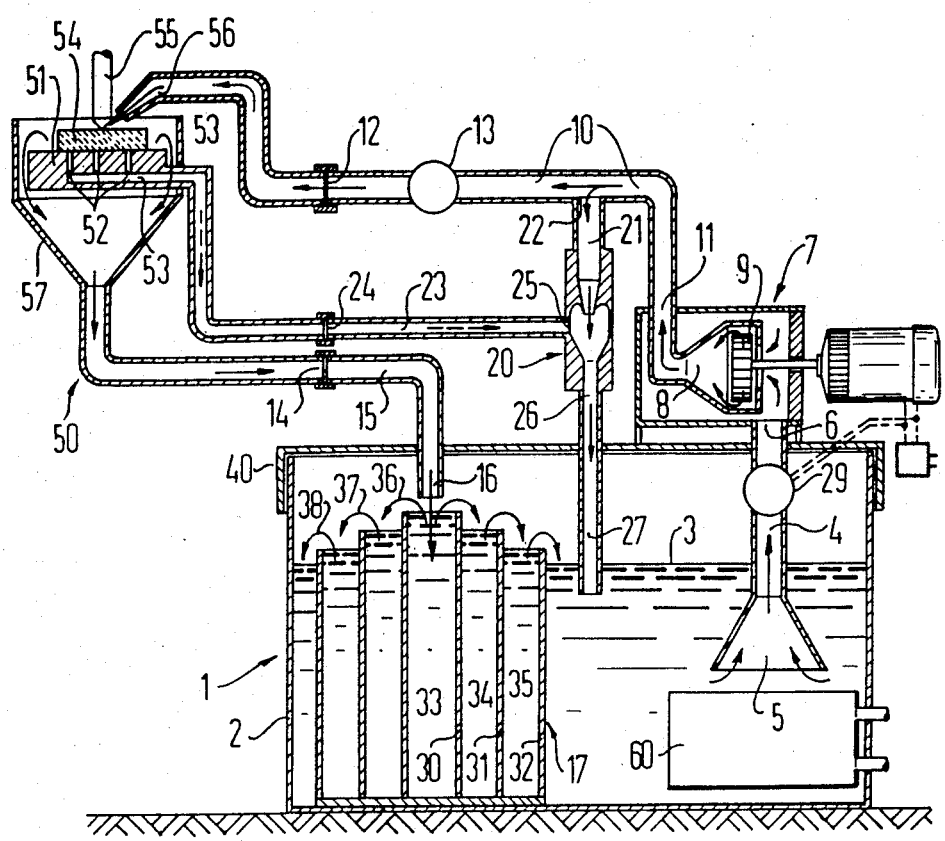

DEVICE FOR FACILITATING THE CIRCULATION OF FLUID COOLANT

BACKGROUND OF THE INVENTION

1. Field of the Invention

The present invention pertains to a device for facilitating the circulation of a fluid coolant used in processing procedures such as sawing, drilling, grinding, and the like of hard materials such as crystals, ceramic, sinter and similar materials.

2. Description of the Prior Art

With known devices an appropriate coolant is fed to the spot where the material is processed, and the coolant that drains off is collected and fed back. This feeding-back process may on the one hand be provided because of the cost of a coolant of this kind and on the other hand because of environmental protection requirements.

A great number of devices for facilitating the circulation of a coolant are known. For instance, such devices include means by which the circulating coolant is cleansed again. For this purpose, for instance, settling cleansing means operating on the cascade principle have been used instead of the commonly used filters. The practice of cooling the circulating coolant by using a heat exchanger is also known. For transferring the coolant and taking into consideration possibly erosive particles contained therein, rotary pumps able to move a significant liquid volume are preferably used.

During the period of processing the materials, for instance, a ceramic slab, it is necessary to secure the slab to the worktable. Negative-pressure suction, i.e., partial vacuum, is frequently applied for this purpose. Holes are drilled in a surface of the worktable that are covered by the workpiece to be processed, for instance, the slab. The negative pressure applied through these holes in the worktable firmly fixes the workpiece to the surface of the worktable. The required negative pressure is in known manner generated with conventional negative-pressure pump. In the selection of this pump, it is important that the pump be impervious to the coolant flowing into it, since the coolant will penetrate into the suction path.

SUMMARY OF THE INVENTION

It is an object of the present invention to provide a fluid coolant circulation device in which the features in combination are so coordinated with one another that with in principle minimal technical effort, maximum operational efficiency on the one hand and practical, simple application and handling are possible on the other hand.

It is another object of the invention to provide such a fluid coolant circulation device in which fluid loss in the device and the related components is minimal.

It is a further object of the invention to provide such a fluid coolant circulation device having a settling cascade that is easily exchangeable.

It is still another object of the invention to provide such a fluid coolant circulation device in which all the functions of the device can be provided with a single transfer pump.

It is a still further object of the invention to provide such a fluid coolant circulation device that is compact and easily transported from place to place.

It is another object of the invention to provide such a fluid coolant circulation device incorporating a means fixing a workpiece to a worktable by suction as an integral part of the device.

The attainment of these and related objects may be achieved through use of the novel fluid coolant circulation device herein disclosed. A fluid coolant circulation device in accordance with this invention has a storage and collection tank for the fluid, with an injector pump for transferring and pressurizing the coolant. At least one fluid-jet negative-pressure pump generates a suction negative pressure at a suitable location on a worktable forming part of the device. A settling cascade, preferably in the storage and collection tank, serves as a cleansing means for the coolant. A heat exchanger is also preferably provided, which is positioned most advantageously in the storage and collection tank below the fluid level planned for the coolant. The device further comprises a plurality of connecting pipes. A first pipe is provided whose one end is connected with the inlet of the injector pump and the other end extends below the operational fluid level of the coolant in the storage and collection tank. A second pipe connects the outlet of the injector pump with the coolant outlet of the device, i.e., the outlet at which the coolant passes from the device to the actual processing means (saw, drilling unit, grinding device, etc.). A third pipe connects the coolant return inlet of the device with the inlet of the settling cascade. A fourth pipe is provided which connects the outlet of the injector pump with the operating-means inlet of the fluid-jet negative-pressure pump. A fifth pipe connects the negative-pressure inlet of the fluid-jet negative-pressure pump to the suction means which is provided at the worktable for fixing the workpiece to be processed in place. A sixth pipe is provided which extends from the outlet of the fluid-jet negative-pressure pump to below the planned operational fluid level in the storage and collection tank. The settling cascade used for cleansing the fluid includes several concentrically arranged chambers. The cascade should be easily removable for cleaning.

Further clarifying explanations relating to the invention are outlined in the following description and the variants of the invention treated in this description, taken together with the drawing, in which:

BRIEF DESCRIPTION OF THE DRAWING

The sole FIGURE of drawing is a schematic cross-section view of a fluid coolant device in accordance with the invention.

DETAILED DESCRIPTION OF THE INVENTION

The FIGURE illustrates a device 1 according to the invention. Numeral 2 designates a storage and collection tank. For operational purposes, the coolant fluid contained therein has a fluid level 3. Numeral 4 designates a first pipe whose one end 5 extends down below the fluid level 3 and whose other end 6 is connected with the inlet of the electrically driven injector pump 7. The distinguishing feature of this injector pump 7 is a convergent conus 8, by means of which the coolant fluid transferred by the impeller 9 of the pump 7 is reduced to a narrower cross-section for the purpose of increasing pressure in the second pipe 10.

The arrows appearing in the FIGURE point out the direction of flow of the coolant fluid during operation.

This second pipe 10 leads from the outlet 11 of the injector pump 7 to the coolant outlet 12 of the device.

Numeral 13 designates a regulating valve optionally fitted into the second pipe 10. With this valve, a reduction in volume of the coolant transferred through the outlet opening 12 is obtainable. This valve 13 particularly serves the purpose of maintaining sufficient high pressure between the outlet 11 of the pump 7 and the valve 13 for the fluid-jet negative-pressure pump 20 to be described below.

Numeral 13 designates the coolant backflow inlet of the device 1. The third pipe 15 leads to the inlet 16 of the settling cascade 17 provided for cleansing the coolant.

Numeral 20 designates a fluid-jet negative-pressure pump. Its inlet 21, serving the purpose of feeding its operating means, is connected via the fourth pipe 22 with the outlet 11 of the injector pump 7. In the present embodiment, this pipe 22 is connected with pipe 10 instead of being directly connected with the injector pump 7. This arrangement reduces the quantity of pipe required. Numeral 23 designates the fifth pipe, which leads from the negative-pressure inlet 24 of device 1 to the negative-pressure inlet 25 of the fluid-jet negative pressure pump 20. From the outlet 26 of this pump 20, the sixth pipe 27 should preferably extend down to below the planned operational fluid level 3. Its immersed end is designated by numeral 28.

Numeral 29 designates a magnetic valve, which serves the purpose of closing off pipe 4 so that, while the storage and collection tank is emptying, the injector pump 7 will continue to be filled with fluid, i.e., to ensure that no suction problems will arise when newly starting operation. Preferably, the controlling of the magnetic valve 29 should be coupled with the controlling of the motor of the injector pump 7. When the motor is switched on or off, the magnetic valve 25 will be simultaneously opened or closed.

The cascade 17 comprises, for example, three containers 30, 31 and 32 arranged one inside the other. In particular, these are cylindrical containers which form the chambers 33, 34 and 35. The upper ends of the chambers 33, 34 and 35 shown in the FIGURE are open. The coolant fluid flowing back from above the inlet 16 of the settling cascade first flows, as the FIGURE illustrates, into the innermost chamber 33. As numeral 36 indicates, when the chamber 33 is filled to overflowing, the coolant fluid flows over the edge into the second chamber 34. In like manner, as numeral 37 indicates, it flows into the third chamber 35 and then, as indicated by numeral 38, back to the storage and collection tank 2. The settling of the residue material from the processed workpiece transferred with the coolant via pipe 15 is effected in a known manner.

The settling cascade may also be constructed with a lesser number of such containers 30, 31, 32, but also with a greater number.

Numeral 40 designates a removable cover of the container 2. The cover 40 may especially provide the base for the construction of the elements of the device positioned above the cover as illustrated in the FIGURE.

Since the essential processing means 50, which must be connected with the said device 1 according to the invention, is not actually directly a component of the device 1 according to the invention, it is only schematically illustrated. A workpiece 54 is positioned on the worktable 51, which has boreholes 52 and a suction funnel 53. The workpiece 54 is processed with a tool 55. The coolant fluid is fed to the contact surfaces between the workpiece 54 and the tool 55 by means of a nozzle 56. The excess coolant fluid drains into the container 57 and is funneled to the return inlet 14 of device 1.

No problems will result for the device 1 according to the invention if any coolant fluid transferred via pipe 10 seeps through one of the boreholes 52 and enters the inlet 24 of the pipe 23 or the fluid-jet negative-pressure pump 20. This pump expediently feeds this quantity of fluid back again, via pipe 27, into the storage and collection tank 2, so that also in this respect no loss of coolant occurs.

Numeral 60 designates a heat exchanger. This heat exchanger is preferably positioned in close proximity to the inlet end of transfer pipe 4 in the container 2.

The operation of a device according to the invention, especially of the device 1 illustrated in the FIGURE, is detailed in the foregoing description of the said device. A closed coolant cycle is obtained via pipe 4, the injector pump 7 and pipe 10, through the processing means 50, and return into the container 2 via pipe 15 and the cascade 17. A second cycle is possible via pipe 4, the injector pump 7, pipe 22, the fluid-jet negative-pressure pump 20 and pipe 27, returning to the container 2. A third cycle is the one leading through pipe 4, the injector pump 7, pipe 10, then through the means 50, the pipe 23, pump 20 and pipe 27.

It is within the scope of the skills of the technician versed in the art to devise further embodiments of, and improvements on, the device according to the invention. It is intended that such changes be included within the spirit and scope of the claims appended hereto.

What is claimed is:

1. A fluid coolant circulation device for a workpiece processing means, comprising:
    a storage and collection tank,
    an injector pump for transferring and pressurizing the coolant,
    at least one fluid-jet negative-pressure pump,
    a settling cascade for cleansing the coolant,
    a heat exchanger, and
    pipes for transferring the coolant, including
    a first transfer pipe, one end of which is connected to an inlet of the injector pump and whose other end extends under the planned operational fluid level in the storage and collection tank,
    a second transfer pipe connecting an outlet of the injector pump with a coolant outlet of the device,
    a third transfer pipe connecting a coolant return flow inlet of said device to said settling cascade,
    a fourth transfer pipe connecting the outlet of the injector pump with an operational inlet of the fluid-jet negative-pressure pump,
    a fifth transfer pipe connecting a negative-pressure inlet of said device with a negative-pressure inlet of the fluid-jet negative-pressure pump, and
    a sixth transfer pipe extending from an outlet of the fluid-jet negative-pressure pump to under the planned operational fluid level in the storage and collection tank.

2. A fluid coolant circulation device according to claim 1 in which said settling cascade comprises a plurality of concentric chambers.

3. A fluid coolant device according to claim 2 in which said settling cascade chambers are cylindrical.

4. A fluid coolant device according to claim 3, in which said heat exchanger is positioned in the storage and collection tank proximate to the fluid end of said first transfer pipe.

5. A fluid coolant device according to claim 1, in which said heat exchanger is positioned in the storage and collection tank proximate to the fluid end of said first transfer pipe.

6. A fluid coolant device according to claim 1 in which a valve is so positioned in said second transfer pipe to control the quantity of coolant emitted from the coolant outlet of said device.

7. A fluid coolant device according to claim 1 in which said fourth transfer pipe branches off from said second transfer pipe.

8. A fluid coolant device according to claim 1 in which said injector pump is positioned above the planned fluid level of the storage and collection tank and a stop valve is provided in said first transfer pipe for shutting off the coolant fluid contained in the injection pump from said storage and collection tank.

9. A fluid coolant device according to claim 8, in which the stop valve is a magnetic valve, a control of which is coupled with that of said injector pump.

10. A fluid coolant device according to claim 1 in which said storage and collection tank has a cover which provides a structural base for supporting said pumps and said transfer pipes.

* * * * *